US009110669B2

(12) United States Patent
Jo

(10) Patent No.: US 9,110,669 B2
(45) Date of Patent: Aug. 18, 2015

(54) POWER MANAGEMENT OF A STORAGE DEVICE INCLUDING MULTIPLE PROCESSING CORES

(75) Inventor: Myung-Hyun Jo, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 440 days.

(21) Appl. No.: 13/530,840

(22) Filed: Jun. 22, 2012

(65) Prior Publication Data

US 2013/0007488 A1 Jan. 3, 2013

(30) Foreign Application Priority Data

Jun. 28, 2011 (KR) .................. 10-2011-0063040

(51) Int. Cl.
*G06F 1/26* (2006.01)
*G06F 1/32* (2006.01)
*G06F 3/06* (2006.01)

(52) U.S. Cl.
CPC ............ *G06F 1/3287* (2013.01); *G06F 1/3221* (2013.01); *G06F 1/3228* (2013.01); *G06F 1/3246* (2013.01); *G06F 1/3268* (2013.01); *G06F 3/0625* (2013.01); *G06F 3/0634* (2013.01); *G06F 3/0674* (2013.01); *Y02B 60/1246* (2013.01); *Y02B 60/1282* (2013.01); *Y02B 60/32* (2013.01)

(58) Field of Classification Search
CPC .................................................. G06F 1/3234
USPC ........................................................ 713/320
See application file for complete search history.

(56) References Cited

U.S. PATENT DOCUMENTS

| 5,682,273 | A * | 10/1997 | Hetzler ............................ 360/75 |
| 8,245,070 | B2 * | 8/2012 | Finkelstein et al. .......... 713/375 |
| 2005/0114722 | A1 * | 5/2005 | Tanaka et al. ................. 713/320 |
| 2005/0154931 | A1 * | 7/2005 | Oh ................................. 713/300 |
| 2005/0289367 | A1 * | 12/2005 | Clark et al. ................... 713/300 |
| 2006/0026447 | A1 * | 2/2006 | Naveh et al. ................. 713/322 |
| 2006/0069936 | A1 * | 3/2006 | Lint et al. ..................... 713/320 |
| 2008/0059694 | A1 * | 3/2008 | Lee ................................ 711/103 |
| 2008/0104425 | A1 | 5/2008 | Gunther et al. |
| 2009/0150777 | A1 * | 6/2009 | Feldman et al. .............. 715/702 |
| 2010/0274653 | A1 * | 10/2010 | Hammad ................... 705/14.25 |
| 2012/0284544 | A1 * | 11/2012 | Xian et al. .................... 713/320 |

FOREIGN PATENT DOCUMENTS

| JP | 2006-293768 | 10/2006 |
| KR | 102010032162 | 3/2010 |
| KR | P2010-0137007 | 12/2010 |

* cited by examiner

*Primary Examiner* — Jaweed A Abbaszadeh
*Assistant Examiner* — Xuxing Chen
(74) *Attorney, Agent, or Firm* — F. Chau & Associates, LLC

(57) ABSTRACT

A method of managing power of the storage device including a first processing core for controlling a first function block and a second processing core for controlling a second function block includes: analyzing a pattern of commands received from the outside; selecting an operation mode of the storage device based on the analyzed pattern; and managing the electric power of the storage device by using the first processing core if the selected operation mode is a first mode, and separately managing electric powers of the first and second function blocks by using the first and second processing cores, respectively, if the selected operation mode is a second mode.

23 Claims, 11 Drawing Sheets

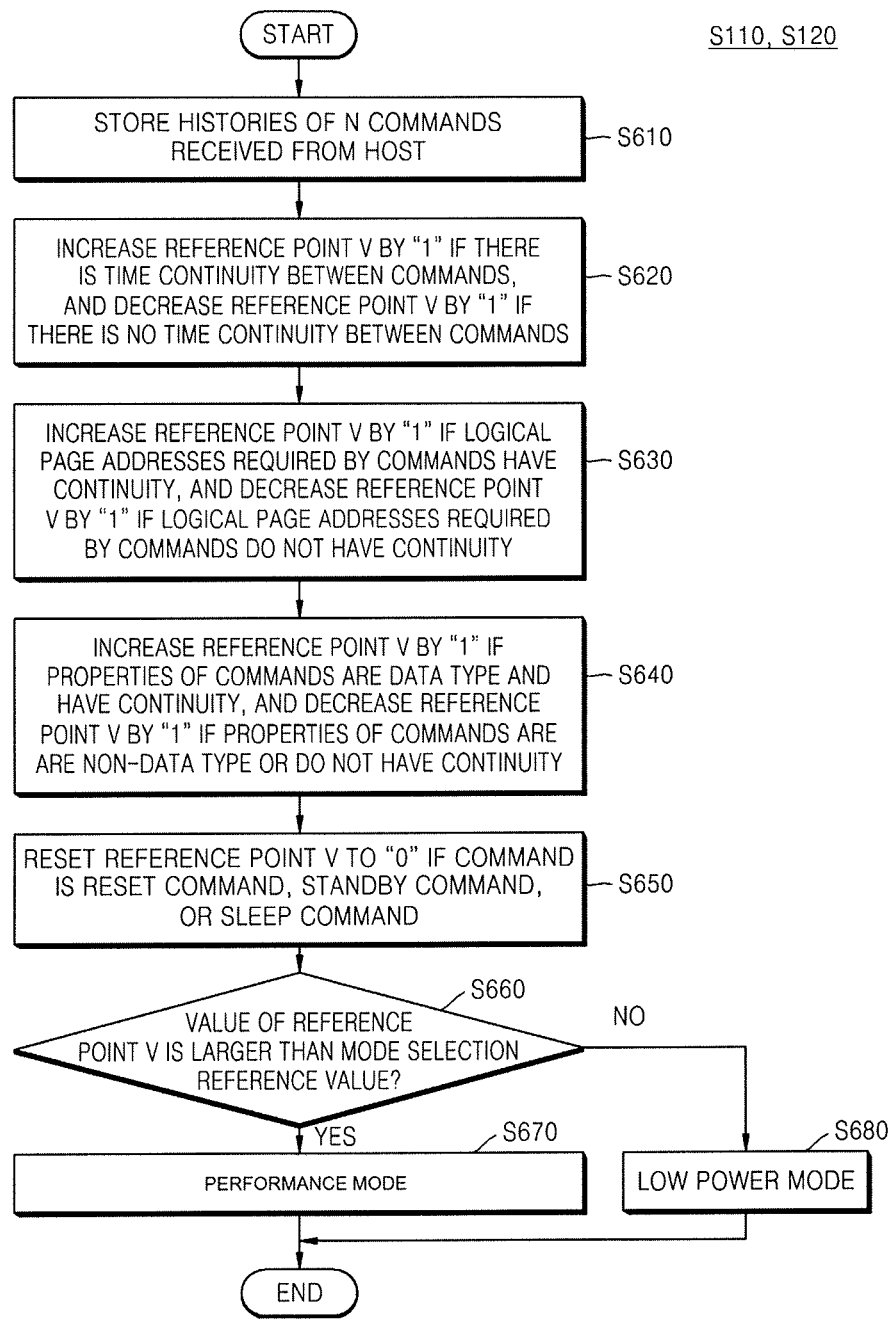

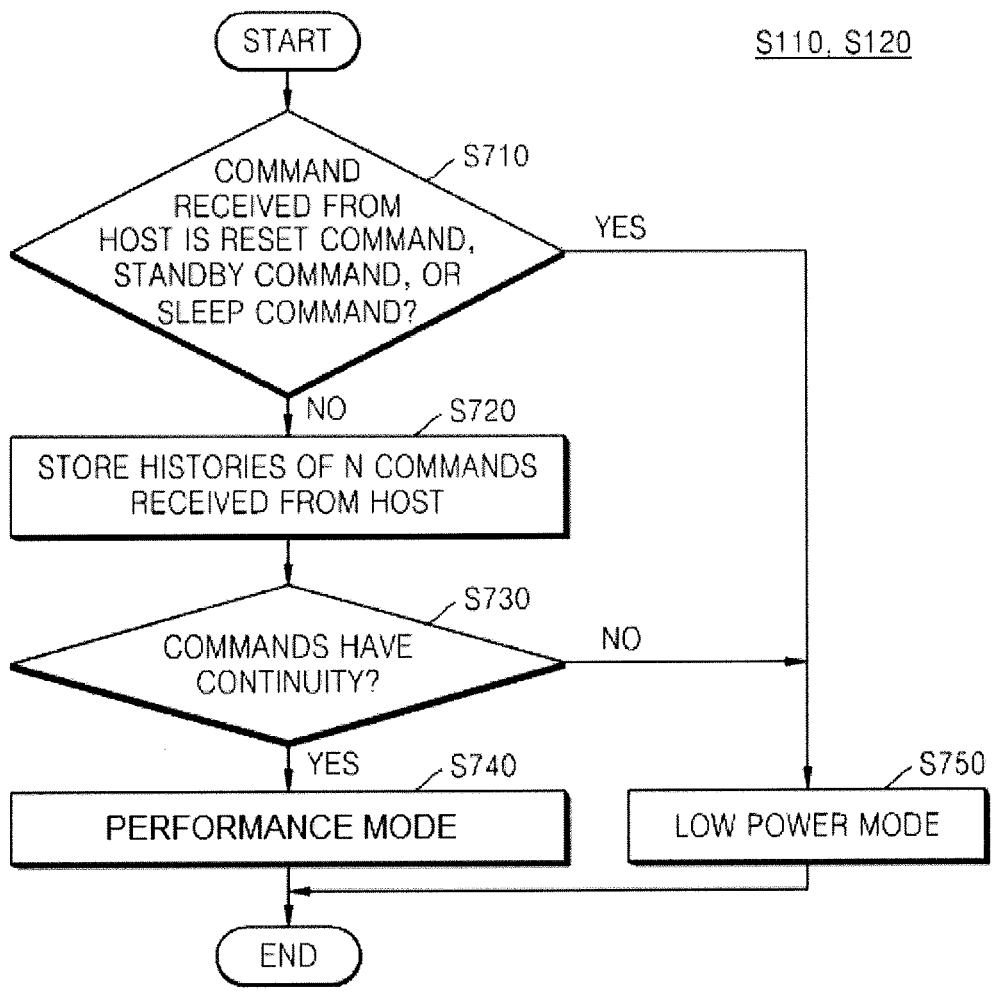

POWER MANAGEMENT OF A STORAGE DEVICE INCLUDING MULTIPLE PROCESSING CORES

CROSS-REFERENCE TO RELATED APPLICATIONS

This application claims priority to Korean Patent Application No. 10-2011-0063040, filed on Jun. 28, 2011, in the Korean Intellectual Property Office, the disclosure of which is incorporated by reference herein.

TECHNICAL FIELD

The inventive concept relates to a storage device, and more particularly, to a storage device that includes multiple processing cores and management thereof.

DISCUSSION OF RELATED ART

A multi-core processor is a single computing component with two or more independent actual processors (e.g., "cores"), which are the units that read and execute program instructions. A storage device such as a solid state drive (SSD) may operate more quickly using a multi-core processor. However, use of the multi-core processor increase the amount of power consumed by the storage device. Thus, use time of a device powered by a battery, such as notebook computer, is shortened when its storage device includes a multi-core processor. Accordingly, there is a need for a method for reducing power consumption in a storage device that includes a multi-core processor.

SUMMARY

At least one embodiment of the inventive concept may provide a method of efficiently managing electric power in a storage device using a plurality of processing cores.

According to an exemplary embodiment of the inventive concept, a method of managing electric power of a storage device including a first processing core for controlling a first function block and a second processing core for controlling a second function block includes analyzing a pattern of commands received by the device, selecting an operation mode of the storage device based on the analyzed pattern, managing the electric power of the storage device by using the first processing core if the selected operation mode is a first mode, and separately managing electric powers of the first and second function blocks by using the first and second processing cores, respectively, if the selected operation mode is a second mode.

The managing the electric power of the storage device by using the first processing core may include determining whether tasks assigned to the first and second processing cores have ended, by using the first processing core, and changing states of the first and second function blocks and a state of a shared function block into a low power state, by using the first processing core, if the tasks assigned to the first and second processing cores have ended.

The separately managing the electric powers of the first and second function blocks by using the first and second processing cores, respectively, may include determining whether a task assigned to the first processing core and a task assigned to the second processing core have ended, by using the first and second processing cores, respectively, and changing a state of a function block controlled by a processing core in which a task has ended, from among the first and second processing cores, into a low power state.

The storage device may further include a shared function block controlled by the first and second processing cores, and the separately managing the electric powers of the first and second function blocks by using the first and second processing cores, respectively, may further include writing information indicating a task assigned to a memory shared by the first and second processing cores has ended, by using the processing core in which a task has ended, confirming whether tasks of the first and second processing cores have ended, by using the first processing core to check the shared memory, and changing a state of the shared function block into the low power state.

The analyzing the pattern of the commands may include analyzing the pattern of the commands according to one or more from among continuity of time, continuity of logical page addresses, and continuity of properties of the commands.

The analyzing the pattern of the commands may include storing a history of 'n' commands received by the storage device (e.g., from the outside), where 'n' is an integer larger than one, and analyzing a pattern of the commands based on the stored history.

The analyzing the pattern of the commands based on the stored history may include setting a reference point for the history of the commands, and increasing or decreasing the reference point by determining whether the commands have continuity of time, continuity of logical page addresses, or continuity of properties of the commands, based on the history of the commands.

The selecting the operation mode of the storage device may include determining that the operation mode is the first mode if a resultant value of the reference point exceeds a mode selection reference value and determining that the operation mode is the second mode if the resultant value of the reference point is below the mode selection reference value.

The selecting the operation mode of the storage device may include determining that the operation mode is the first mode if the command received from the outside is a reset command, a sleep command, or a standby command.

The storage device may further include a third processing core for controlling a third function block, and the managing the electric power may include managing the electric power of the storage device by using the first processing core if the selected operation mode is the first mode, and separately managing electric powers of the first, second, and third function blocks by using the first, second, and third processing cores, respectively, if the selected operation mode is the second mode.

An initial operation mode of the storage device may be the first mode.

The storage device may include a solid state drive (SSD).

According to an exemplary embodiment of the inventive concept, a method of managing electric power of a storage device (e.g., high capacity) including a first processing core for controlling a first function block and a second processing core for controlling a second function block includes managing the electric power of the storage device by using the first processing core, receiving an external power management on signal, selecting an operation mode of the storage device by analyzing a pattern of 'n' commands received, where 'n' is an integer larger than one, and separately managing electric powers of the first and second function blocks by using the first and second processing cores, respectively, if a low power mode is selected.

The method may further include selecting the operation mode of the storage device by analyzing a pattern of other received commands, and managing the electric power of the storage device by using the first processing core if a performance mode is selected.

The method may further include receiving an external power management off signal and managing the electric power of the storage device by using the first processing core.

According to an exemplary embodiment of the inventive concept, a storage device includes a first processing core, a second processing core, a first function block, a second function block, and a memory. One of the processing cores is configured to analyze commands received by the storage device to select one of a first mode and a second mode. One of the processing cores manages power of the first and second functional blocks when the first mode is selected. The first processing core manages power of the first function block and the second processing core manages power of the second function block when the second mode is selected.

In an embodiment, each function block is set to a lower power state by the processing core that manages its power after all tasks of the corresponding core have ended. In the embodiment, each processing core may be configured to apply a clock signal to the function block whose power it manages while the corresponding core is performing at least one task, and each processing core may be configured to prevent application of the clock signal to the function block whose power it manages to set the function block to the lower power state.

In an embodiment, the storage device further includes a third function block that is shared by the first and second processing cores, and configured to handle tasks relating to the host and the memory. In the embodiment, the first function block is configured to handle tasks related only to the host, and the second function block is configured to handle tasks related only to the memory. In the embodiment, the third function block may include a shared memory, and each processing core may be configured to store a record in the shared memory indicating it has ended a task.

BRIEF DESCRIPTION OF THE DRAWINGS

Exemplary embodiments of the inventive concept will be more clearly understood from the following detailed description taken in conjunction with the accompanying drawings in which:

FIG. 6 is a flowchart illustrating a process of selecting an operation mode by analyzing patterns of commands, according to an exemplary embodiment of the inventive concept;

FIG. 7 is a flowchart illustrating a process of selecting an operation mode by analyzing patterns of commands, according to an exemplary embodiment of the inventive concept;

DETAILED DESCRIPTION

Figure 1:
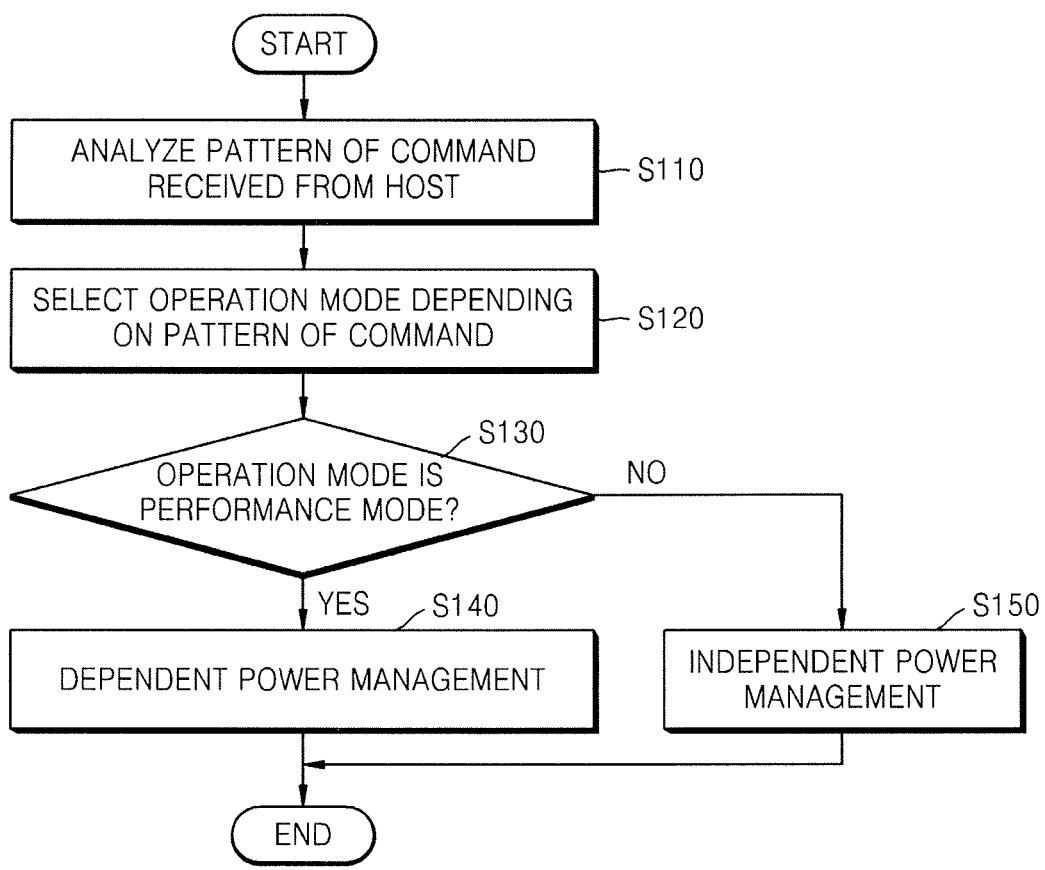
FIG. 1 is a flowchart illustrating a method of managing electric power of a storage device according to an exemplary embodiment of the inventive concept.

Reference will now be made in detail to exemplary embodiments of the inventive concept, examples of which are illustrated in the accompanying drawings. However, the inventive concept is not limited to these embodiments.

As used herein, the singular forms "a", "an", and "the" are intended to include the plural forms as well, unless the context clearly indicates otherwise.

Hereinafter, the present inventive concept will be described in detail by explaining exemplary embodiments thereof with reference to the attached drawings. Like reference numerals in the drawings denote like elements.

FIG. 1 is a flowchart illustrating a method of managing electric power of a storage device according to an exemplary embodiment of the inventive concept.

Referring to FIG. 1, patterns of commands received from a host are analyzed (Operation S110) and then an operation mode of the storage device is selected according to the analysis (Operation S120). When it is determined that the storage device is to operate in a first mode, for example, a performance mode, the electric power (hereafter, referred to as power) of the storage device is managed by using a dependent power management method (e.g., operations S130 and S140). When it is determined that the storage device is not to operate in the performance mode, the power of the storage device is managed by using an independent power management method (e.g., operations S130 and S150). Below, the method of managing the power of the storage device according to an embodiment of the inventive concept is described in more detail with reference to FIG. 2.

Figure 2:
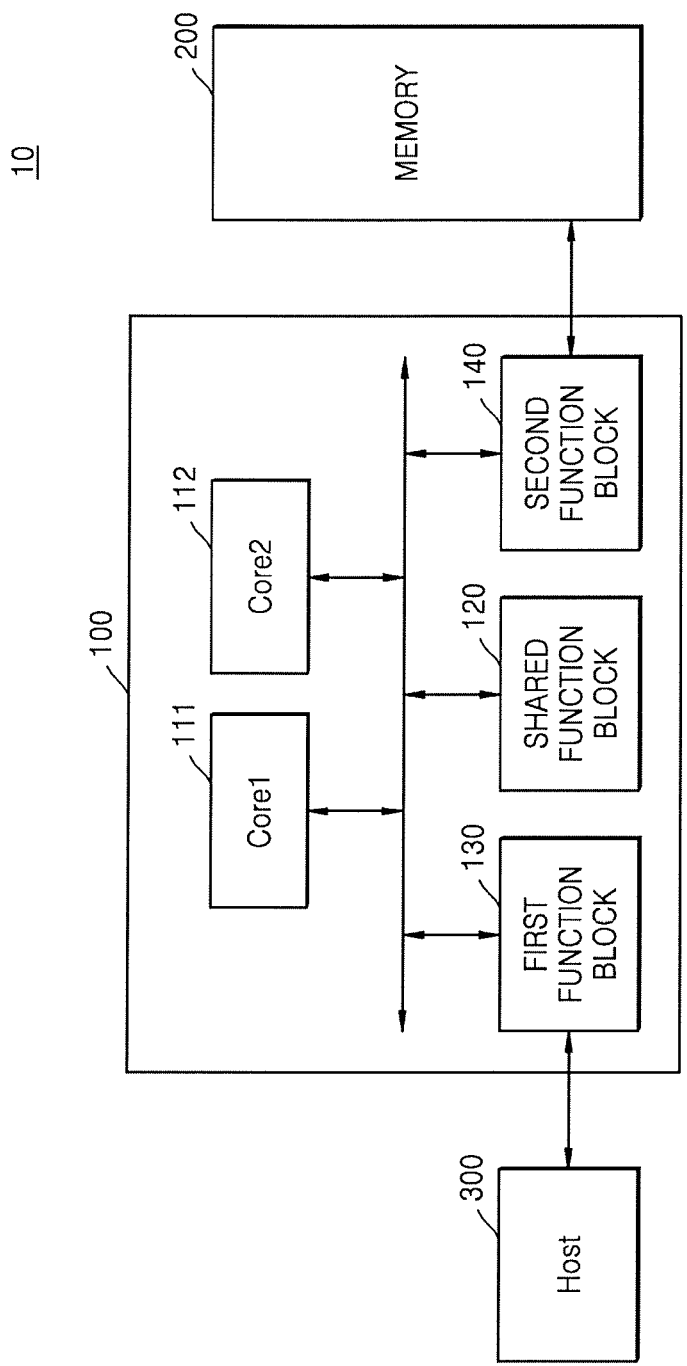
FIG. 2 is a block diagram of a storage device according to an exemplary embodiment of the inventive concept.

FIG. 2 is a block diagram of a storage device 10 according to an exemplary embodiment of the inventive concept.

Referring to FIG. 2, the storage device 10 includes a control unit 100 and a nonvolatile memory 200. The control unit 100 executes a command received from a host 300, and controls an operation of writing data to the nonvolatile memory 200 or reading data from the nonvolatile memory 200. As an example, the nonvolatile memory 200 may be a flash memory or a phase change memory used as an area for storing data received from the host 300. Although the storage device 10 of FIG. 2 is illustrated as a solid state drive (SSD) including the nonvolatile memory 200, the inventive concept is not limited thereto. For example, the storage device 10 may be a hard disc drive (HDD).

The control unit 100 includes a plurality of cores 111 and 112 and a plurality of function blocks 120, 130, and 140. Although, in FIG. 2, it is illustrated that the control unit 100 includes two cores, namely, first and second processing cores 111 and 112, the control unit 100 may include three or more processing cores. The first core 111 and the second core 112 perform an operation related to the host 300 and an operation related to the nonvolatile memory 200, respectively. A shared function block 120 is a block commonly used when the first core 111 or the second core 112 performs a task and is controlled by the first core 111 and the second core 112. A first function block 130 is a block used when performing an operation related to the host 300 and is controlled by the first core 111. A second function block 140 is a block used when performing an operation related to the nonvolatile memory 200 and is controlled by the second core 112.

Referring back to FIG. 1, in operation S110, the patterns of the commands received from the host 300 are analyzed. For example, a history of 'n' commands (e.g., 'n' is an integer larger than one) received from the host 300 is stored, and patterns of the 'n' commands are analyzed based on the stored history. For example, the patterns of the 'n' commands may be analyzed according to continuity of time of the commands, continuity of logical page addresses, and continuity of properties of the commands. An analysis method according to an exemplary embodiment of the inventive concept is described in detail below with reference to FIG. 6.

In operation S120, an operation mode is selected depending on the patterns of the commands analyzed in operation S110. An access frequency of input/output (I/O) terminals of the storage device 10 is changed according to the commands received. It may be determined that when the access frequency is high, the first mode, namely, the performance mode, is selected, and when the access frequency is low, a second mode, namely, a low power mode, is selected. Thus, it is decided whether the storage device 10 is to operate in the performance mode or in the low power mode by determining whether the analyzed patterns of the commands correspond to the performance mode or the lower power mode.

In operation S130, it is determined whether the operation mode selected in operation S120 is the performance mode.

In operations S110, S120, and S130, selecting an operation mode by analyzing the patterns of the commands and determining whether the selected operation mode is the performance mode may be performed by the first core 111, which is for performing tasks related to the host 300. According to an exemplary embodiment of the inventive concept, the storage device 10 may further include a pattern detector (not shown) and the patterns of the commands may be analyzed by the pattern detector.

In operation S140, when it is determined that the storage device 10 is to operate in the performance mode, power of the storage device 10 is managed according to the dependent power management method. The dependent power management method is a method in which one of the plurality of cores 111 and 112 (hereinafter referred to as a master core) manages all the power of the storage device 10. For example, when the first core 111 is set as the master core, the first core 111 manages the power of the storage device 10 by determining task performance states of the first core 111 and the second core 112. When the master core manages the power of the storage device 10 by determining whether tasks of all cores have ended, stability of the storage device 10 may be improved and the storage device 10 may respond more quickly to the host 300. For example, the master core can cause the storage device 10 to enter into the lower power mode after the tasks of all cores have ended. Since the period when no tasks are running may be short, the period in which the storage device 10 operates in the low power state may also be relatively short.

In operation S130, when it is determined that the storage device 10 is to operate in the low power mode, the power of the storage device 10 is managed according to the independent power management method (S150). The independent power management method is a method in which each of the plurality of cores 111 and 112 independently performing tasks different from each other performs power management on function blocks. For example, the first core 111 for performing a host task, namely, a task related to the host 300, manages power of the first function block 130, and the second core 112 for performing a memory task, namely, a task related to the nonvolatile memory 200, manages power of the second function block 140.

However, because the shared function block 120 is used to perform a host task as well as a memory task, one of the first core 111 and the second core 112 manages the shared function block 120 by determining whether the first core 111 and the second core 112 perform tasks.

Since starting/ending points in time of tasks performed by the cores 111 and 112 are different from each other, it is possible to minimize time required to enter into a low power state of the storage device 10 and maintain the low power state for a relatively longer time by separately managing power for the function blocks 120, 130, and 140 according to a task processing state of each of the cores 111 and 112. Thus, use time of a device having a limited battery, such as a notebook computer may be increased.

Figure 3:
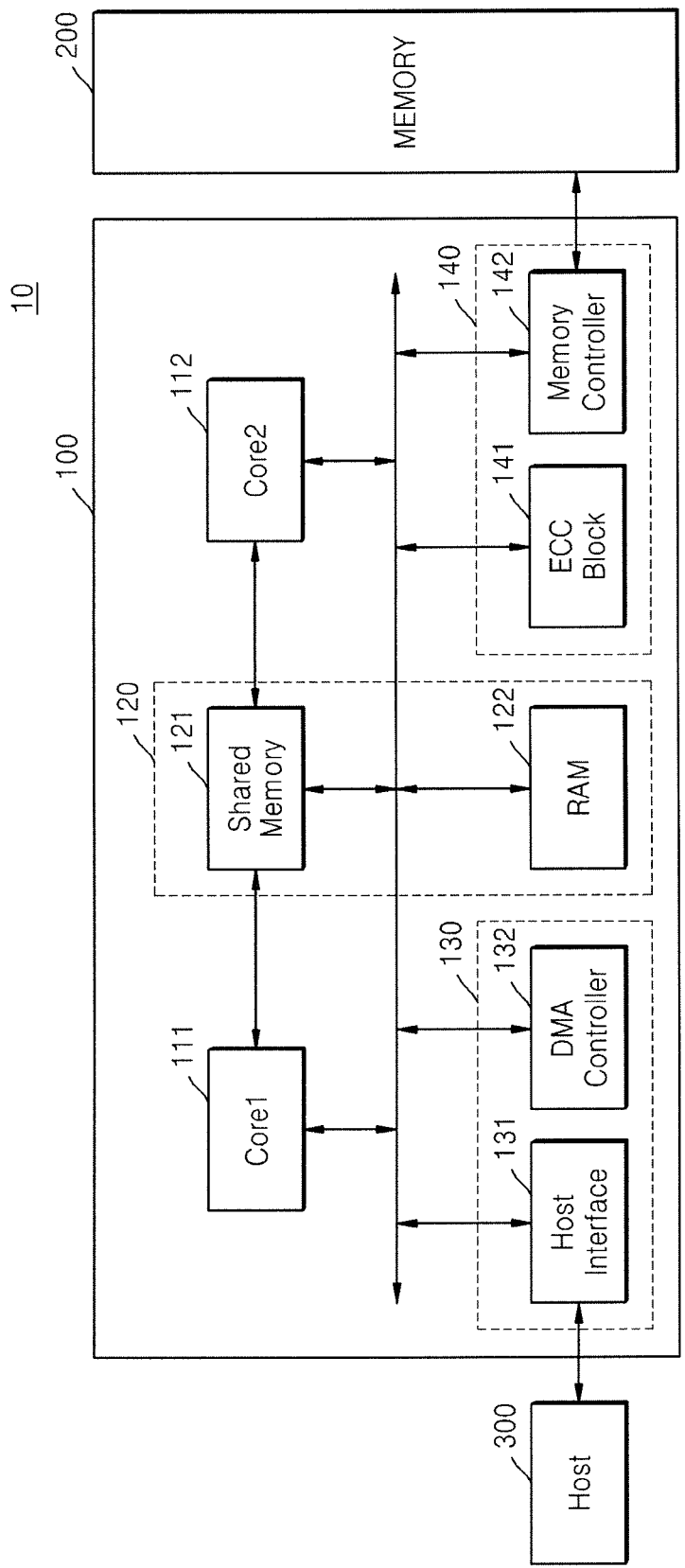
FIG. 3 is a block diagram illustrating the storage device of FIG. 2 according to an exemplary embodiment of the inventive concept.

FIG. 3 is a block diagram illustrating the storage device 10 of FIG. 2 according to an exemplary embodiment of the invention.

In an embodiment, the shared memory 121 includes master information that indicates which of the cores 111 and 112 is the master core. The method of FIG. 1 can additionally include an initial step of each of the cores 111 and 112 checking the shared memory to determine whether they are the master. The core that is the master can then perform the steps of analyzing the patterns, selecting the operation mode based on the analysis, and determining whether the operation mode is the performance mode (e.g., S110-S130). In an embodiment, a command output by the host 300 can be used to set a different one of the cores to be the master by updating the master information.

Referring to FIG. 3, the storage device 10 includes the first core 111, the second core 112, the shared function block 120, the first function block 130, the second function block 140, and the nonvolatile memory 200.

The first core 111 performs a task related to the host 300, and the second core 112 performs a task related to the nonvolatile memory 200.

The shared function block 120 is a function block used when the first core 111 or the second core 112 performs a task, and may include a shared memory 121 and a random access memory (RAM) 122.

The shared memory 121 is used to transmit information between the plurality of cores 111 and 112. Although each of the plurality of cores 111 and 112 separately performs an assigned task, the plurality of cores 111 and 112 can exchange information with each other. As an example, the shared memory 121 may be a buffer or a static random access memory (SRAM). Although the storage device 10 of FIG. 2 can use the shared memory 121 to transmit information between the plurality of cores 111 and 112, the inventive concept is not limited thereto. For example, the plurality of cores 111 and 112 may exchange information with each other using direct memory access (DMA).

The RAM 122 functions as a buffer that temporarily stores data to be transmitted to the host 300 or that temporarily stores data received from the host 300 to store the data in the nonvolatile memory 200. As an example, the RAM 122 may be a dynamic random access memory (DRAM) or a static random access memory (SRAM).

The first function block 130, which is configured to perform a host task, is controlled by the first core 111 and may include a host interface 131 and a direct memory access (DMA) controller 132.

The host interface 131 connects the storage device 10 to the host 300 and enables the storage device 10 to communicate with the host 300. In an embodiment, the host interface 131 is a serial advanced technology attachment (SATA) interface. In an embodiment, the host interface 131 is a serial attached small computer system interface (SAS) interface. However, these are examples, and the host interface 131 is not limited thereto.

The DMA controller 132 is configured to control the host interface 131 to move data without executing a program by using the first core 111. For example, the DMA controller 132 can control the host interface 131 to transfer data from the host 300 directly to the RAM 122 or the shared memory 121 without involving any of the cores.

The second function block 140, which is configured to perform a memory task, is controlled by the second core 112 and may include an error checking and correction (ECC) block 141 and a memory controller 142.

The ECC block 141 generates ECC data for data to be stored in the nonvolatile memory 200 or data to be read from the nonvolatile memory 200 and determines whether there is an error in the data.

The memory controller 142 analyzes data output from the nonvolatile memory 200 according to a control command of the second core 112, and manages and control data of the nonvolatile memory 200, such as by storing and deleting data input to the nonvolatile memory 200.

The nonvolatile memory 200 may include a plurality of blocks for storing data, and may be embodied with a flash memory or a phase change memory.

The storage device 10 may use a protocol such as SATA or SAS to communicate with the host 300. The SATA protocol may require a data performance rate of 1.5 Gbps through 6 Gbps or 3 Gbps through 6 Gbps. The storage device 10 may process a task by dividing the task into jobs for respective execution on the plurality of processing cores 111 and 112. For example, the storage device 10 may maximize its response speed and performance by processing an operation related to the host 300 and an operation related to a physical storage device such as the nonvolatile memory 200 in parallel. Accordingly, the first core 111 can mainly perform processing related to the host 300, and the second core 112 can mainly perform processing related to the nonvolatile memory 200. The host interface 131 and the DMA controller 132 of the first function block 130 are controlled by the first core 111. The ECC block 141 and the memory controller 142 of the second function block 140 and the nonvolatile memory 200 are controlled by the second core 112. Since the shared memory 121 and RAM 122 of the shared function block 120 is commonly used in an operation related to the host 300 and an operation related to the memory, the shared memory 121 and RAM 122 are commonly used when each of the first core 111 and the second core 112 performs a task.

As stated above, it is possible to maximize the response speed and performance of the storage device 10 by dividing a task into jobs for respective execution on the plurality of processing cores 111 and 112. However, power consumption of the storage device 10 may increase when the processing cores 111 and 112 are used in this manner.

Thus, the storage device 10 using multiple processing cores may change states of the function blocks 120, 130, and 140 and the nonvolatile memory 200 into a low power state when a task has ended to reduce power consumption. In an embodiment, the first core 111 and the second core 112 perform power management of the storage device 10 according to the power management method of FIG. 1. In an embodiment, when a task has ended, the first core 111 and the second core 112 cause the function blocks 120, 130, and 140 and the nonvolatile memory 200 to enter the low power state by not applying a clock signal to the function blocks 120, 130, and 140 and the nonvolatile memory 200. In an embodiment, when the clock signal is applied to a function block it has full power and when the clock signal is not applied, the function block has either no power or less power. In an embodiment, the function block is powered by the clock signal or partially powered by the clock signal.

Figure 4A:
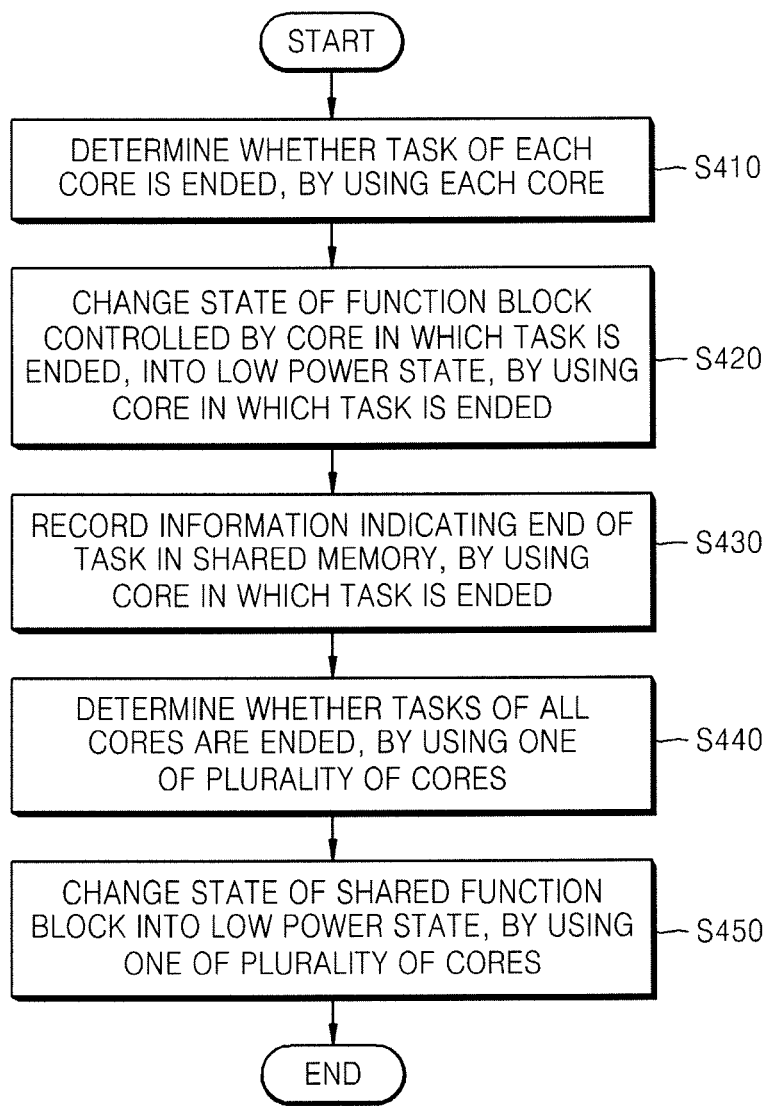
FIG. 4A is a flowchart illustrating a process of entering into a low power state in an independent power management method of FIG. 1 according to an exemplary embodiment of the inventive concept.

FIG. 4A is a flowchart illustrating a process of entering into a low power state according to the independent power management method.

Referring to FIG. 4A, in operation S410, each of the cores 111 and 112 determines whether a task thereof has ended. For example, the first core 111 determines whether a host task related to the host 300 has ended, and the second core 112 determines whether a memory task related to the nonvolatile memory 200 has ended. Since the cores 111 and 112 perform tasks different from each other, starting and ending points in time of tasks performed by the cores 111 and 112 are different from each other. In an embodiment, hardware modules used by the cores 111 and 112 are different from each other.

In an embodiment, a start time of a host task is a point in time when a host command is received. In an embodiment, a start time of a memory task is a point in time when a message is transmitted from the first core 111 to the second core 112. In an embodiment, an end time of the host task is a point in time when a response to an end of the host command is sent to the host 300. In an embodiment, an end time of the memory task is a point in time when storage of data of the message in memory 200 has completed or when an internal operation such as garbage collection has ended. Thus, because the end time of the host task and the end time of the memory task may be different from each other, the first core 111 and the second core 112 respectively determine the end time of the host task and the end time of the memory task.

In operation S420, a core in which a task has ended causes a hardwire module dependent thereon to enter into the low power state. For example, if a host task of the first core 111 is being performed and a memory task of the second core 112 has ended, since the second core 112 determines that a task has ended in the operation S410, the second core 112 changes states of the ECC block 141 and memory controller 142 of the second function block 140 and a state of the nonvolatile memory 200 into the low power state. Since the second function block 140 controlled by the second core 112 is not related to the host task performed by the first core 111, the second function block 140 does not influence the host task performed by the first core 111.

If a host task of the first core 111 has ended and a memory task of the second core 112 is being performed, the first core 111 changes states of the host interface 131 and DMA controller 132 of the first function block 130 into the lower power state.

In operation S430, a core in which a task has ended and having changed a state of a function block controlled thereby into the low power state records information indicating the end of the task in the shared memory 121. For example, when the second core 112 has completed a memory task and has changed a state of the second function block 140 and a state of the nonvolatile memory 200 into the low power state, the second core 112 records information that indicates the second core 112 is in an idle state in the shared memory 121 to inform the first core 111 that the second core 112 is in the idle state. This information may be referred to as a task performance state.

If the memory task is scheduled to be re-started or a new memory task is scheduled to be started at a later time, the second core 112 can set the host interface 131 and DMA controller 132 of the first function block 130 to its original higher power state at the later time and record in the shared memory 121 that the second core 122 is in an active state or an operation state.

In operation S440, it is determined whether tasks of all cores have ended. A specific core determines whether the tasks of all cores have ended, by confirming task performance states recorded in the shared memory 121. For example, when the first core 111 is set as a core for determining whether the tasks of all cores have ended, the first core 111 determines whether the tasks of the first and second cores 111 and 112 have ended, by confirming the task performance states of the first and second cores 111 and 112, which are recorded in the shared memory 121.

In operation S450, if tasks of all cores have ended, a state of the shared function block 120 is changed into the low power state. If the first core 111, in the operation S440, determines that the tasks of all cores have ended by confirming task performances states in the shared memory 121, the state of the commonly used shared function block 120 including the shared memory 121 and the RAM 122 is changed into the low power state. Since the shared function block 120 is used when each core performs a task, the state of the shared function block 120 is changed into the low power state after the tasks of all cores have ended.

Figure 4B:
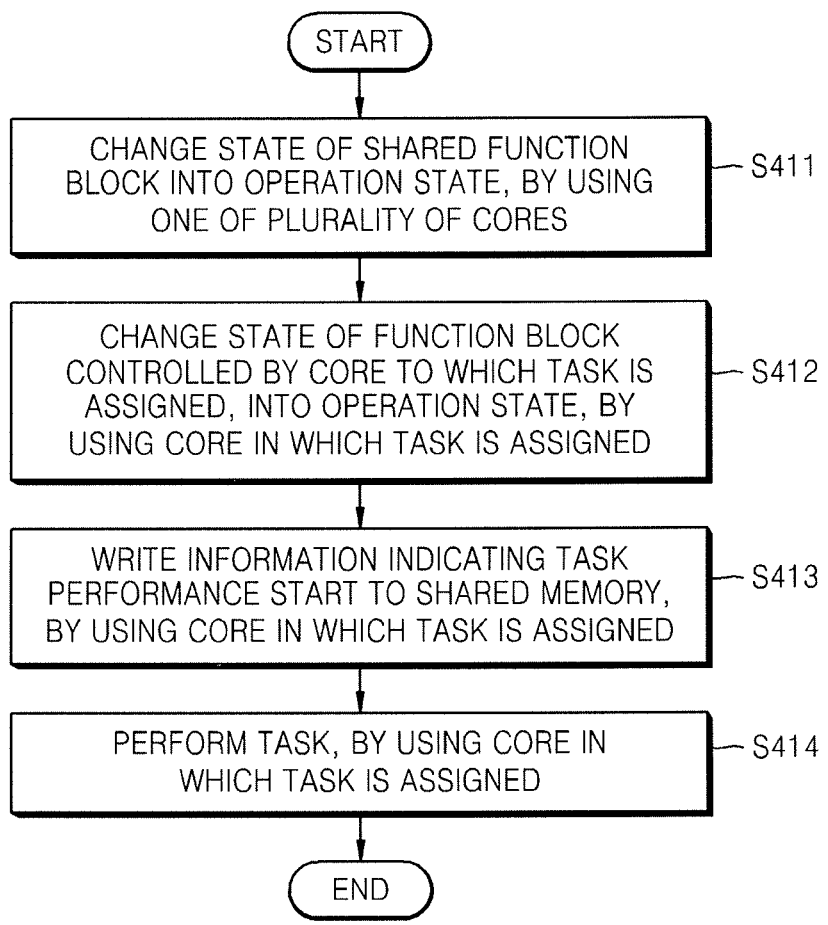
FIG. 4B is a flowchart illustrating a process in which a storage device is changed from a low power state to an operation state, in the independent power management method of FIG. 1 according to an exemplary embodiment of the inventive concept.

FIG. 4B is a flowchart illustrating a process in which the storage device is changed from a low power state to an operation state according to the independent power management method.

In operation S411, a task is assigned to at least one of the cores by a command received from the host 300, and the shared function block 120, namely the shared memory 121 and the RAM 122 enters into the operation state. As illustrated in FIG. 4A, if the first core 111 of the plurality of cores 111 and 112 determines that tasks of the cores 111 and 112 have ended and changes a state of the shared function block 120 into the low power state, the first core 111 also recognizes that a task has been assigned to a specific core and changes the state of the shared function block 120 into the operation state.

In operation S412, a core to which a task is assigned changes a state of a function block controlled thereby into the operation state. For example, if a task is assigned to the first core 111, the first core 111 changes states of the host interface 131 and DMA controller 132 of the first function block 130 into the operation mode. If the second core 112 is not assigned a task, it maintains the second function block 140 in the low power state.

In operation S413, a core to which a task is assigned writes information to the shared memory 121, which indicates a task performance state. For example, if a task related to the host 300 is assigned to the first core 111, the first core 111 writes information that indicates the first core 111 has received the task related to the host 300 and has started to perform the task to the shared memory 121. The first core 111 may perform the task after the information has been written (S414). However, embodiments of the inventive concept are not limited thereto. For example, the first core 111 may perform the task concurrently with or before writing of the information.

Thereafter, if a task is also assigned to the second core 112, the second core 112 performs the operations S412, S413 and S414 as explained with respect to the first core 111. For example, the second core 112 changes the state of the second function block 140 to an operation state, records that it is started to perform this task, and performs the task.

Referring to FIGS. 4A and 4B, in the independent power management method, each of the cores 111 and 112 independently manages power of a function block controlled thereby. It may be possible to reduce power consumption by minimizing time required to enter into a low power state of the storage device 10 and maintaining the low power state for a relatively long time. However, it can be difficult to control an overall data flow of the storage device 10. Thus, by using the independent power management method in a low power mode in which an access frequency of input/output (I/O) terminals is lower than a performance mode in which a faster response speed of the storage device 10 is required, it may be possible to reduce power consumption without deterioration of performance.

Figure 5A:
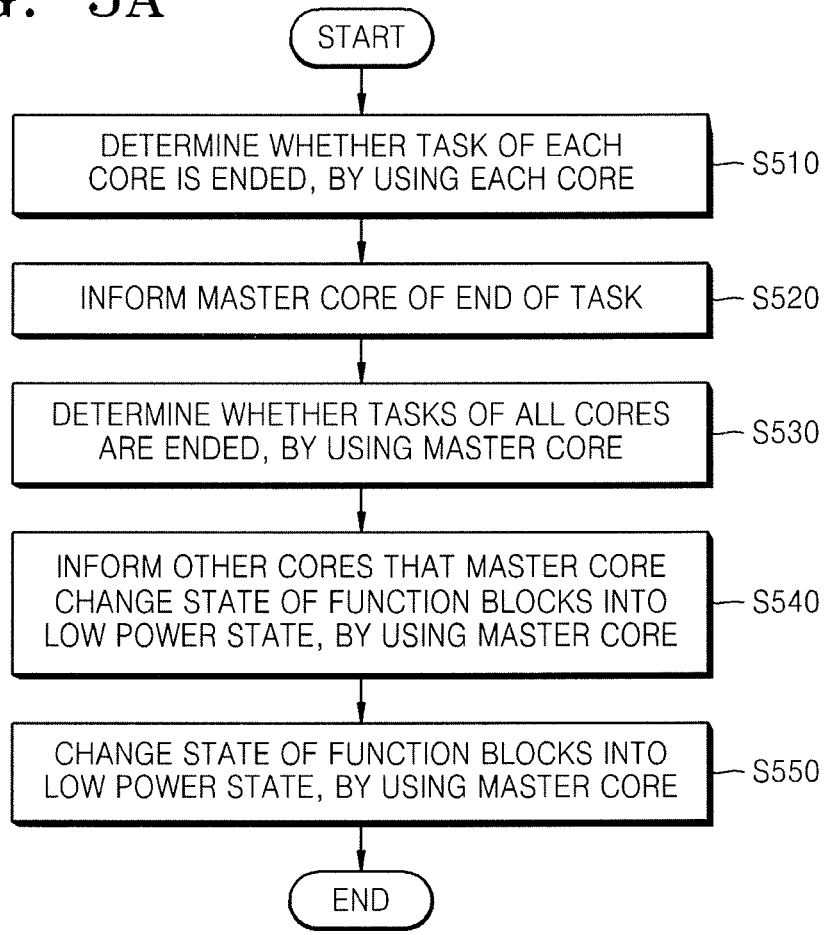
FIG. 5A is a flowchart illustrating a process in which a storage device enters into a low power state in a dependent power management method of FIG. 1 according to an exemplary embodiment of the inventive concept.

FIG. 5A is a flowchart illustrating a process in which the storage device 10 enters into a low power state according to the dependent power management method.

In operation S510, each of the cores 111 and 112 determines whether a task thereof has ended. For example, the first core 111 determines whether a host task has ended, and the second core 112 determines whether a memory task has ended.

In operation S520, a core in which a task has ended informs a master core that the task has ended. The master core is a core that controls the function blocks 120, 130, and 140 and the nonvolatile memory 200, according to the dependent power management method. The first core 111 or the second core 112 may be the master core. In an embodiment, the first core 111, which performs a host task, is the master core. Thus, if a task assigned to the second core 112 has ended, the second core 112 informs (notifies) the first core 111, namely, the master core, that the task assigned to the second core 112 has ended.

In operation S530, the master core determines whether tasks of all cores have ended. For example, if the first core 111 is the master core, the first core 111 determines whether the tasks of all cores have ended due to prior notifications received from the second core 112. For example, in the operation S520, the second core 112 had informed the first core 111 that the task assigned to the second core 112 had ended and whether the task of the first core 111 had ended.

In operation S540, if tasks of all cores have ended, the master core informs each core that a state of the storage device 10 will be changed into the low power state. For example, if the first core 111 is the master core, the first core 111 informs the second core 112 that the function blocks 120, 130, and 140 and nonvolatile memory 200 will enter into the low power state. This is because the second core 112 may not know states of the function blocks 120, 130, and 140 since the first core 111 independently controls the power of the storage device 10. When the function blocks 120, 130, and 140 are in the operation state, the first core 111 informs the second core 112 of a power control state to ensure that a task is performed.

In operation S550, a state of the storage device 10 is changed into the low power state. For example, if the first core 111 is the master core, the first core 111 changes states of the function blocks 120, 130, and 140 of the storage device 10 and a state of the nonvolatile memory 200 into the low power state, after tasks of all cores have ended. In an embodiment, the first core 111 changes the states of the function blocks 120, 130, and 140, and the nonvolatile memory into the low power state simultaneously.

Figure 5B:
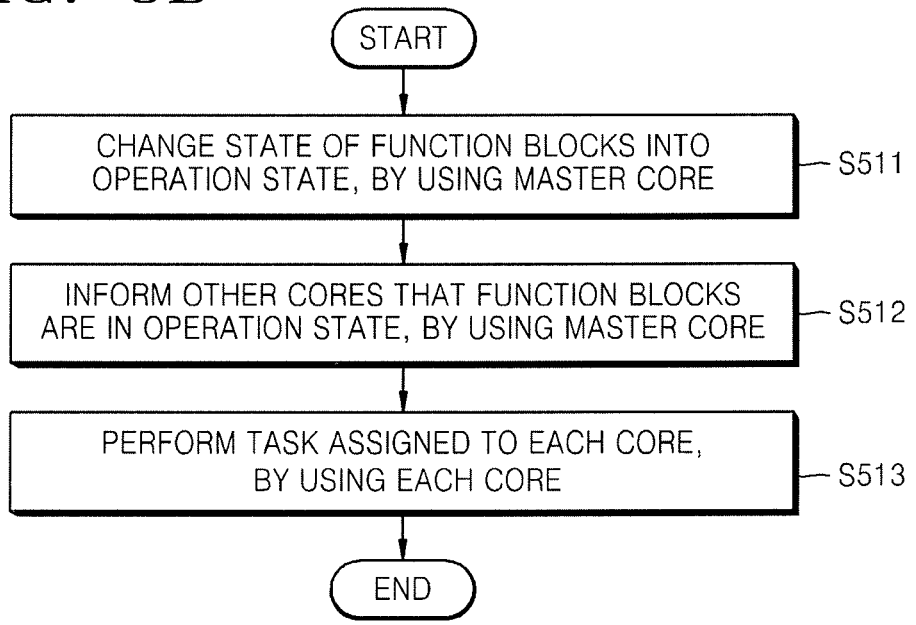
FIG. 5B is a flowchart illustrating a process in which a storage device is changed from a low power state to an operation state, in the dependent power management method of FIG. 1 according to an exemplary embodiment of the inventive concept.

FIG. 5B is a flowchart illustrating a process in which the storage device 10 is changed from a low power state to an operation state according to the dependent power management method.

In operation S511, if the storage device 10 receives a command from the host 300, a master core causes the storage device 10 to enter into the operation state. For example, the first core 111, as the master core, causes the function blocks 120, 130, and 140 of the storage device 10 and the nonvolatile memory 200 to enter into the operation state.

In operation S512, the master core informs each core that the storage device 10 is in the operation state. For example, the first core 111, as the master core, informs the second core 112 that the function blocks 120, 130, and 140 and the nonvolatile memory 200 are in the operation state and thus, if a task is assigned to the second core 112, the second core 112 may perform the task.

In operation S513, each core may perform an assigned task when informed that function blocks controlled thereby are in the operation state.

Referring to FIGS. 5A and 5B, in the dependent power management method, because the master core causes the function blocks 120, 130, and 140 and the nonvolatile memory 200 to enter into the low power state only when tasks of all cores have ended, performance of the storage device 10 may not deteriorate.

However, in the dependent power management method, a duration time of the low power state of the storage device 10 may be relatively short. Thus, the dependent power management method can be performed when patterns of commands received from the host 300 correspond to a performance mode. In this way, the power of the storage device 10 may be managed without deteriorating the performance of the storage device when the storage device 10 operates in the performance mode.

FIG. 6 is a flowchart illustrating, a process of selecting an operation mode by analyzing patterns of commands, according to an exemplary embodiment of the inventive concept.

Referring to FIG. 6, a reference point V for the history of the commands is set to analyze the patterns of the commands, and the reference point V is increased or decreased according to continuity for a plurality of factors of the commands based on the history of the commands. It is determined whether the patterns of the commands correspond to a performance mode or correspond to a low power mode, by using a resultant value of the reference point V.

In operation S610, a history of 'n' commands received from the host 300 is stored, where 'n' is an integer larger than 1. For example, information such as reception times, command types (e.g., read, write, etc.), properties, logical page addresses, and the like for the 'n' commands is stored as the history. To prevent a power management method from changing too frequently, the operation mode is selected by storing a history of at least a certain number of commands and analyzing patterns of the commands. For example, the operation mode may not be changed until that certain number of commands has been stored and analyzed. The history of the 'n' commands may be stored in an internal buffer or queue of a core analyzing the patterns of the commands, for example, the first core 111. When an external buffer, the RAM 122, or the storage device 10 includes a pattern detector (not shown), the history of the 'n' commands may be stored in an internal buffer of the pattern detector.

In operation S620, the reference point V is increased by "1" if there is time continuity between the commands, and the reference point V is decreased by "1" if there is no time continuity between the commands. The time continuity may be determined to be present by checking time intervals between the commands received by the storage device 10 from the host 300. For example, if a value obtained by subtracting a reception time of an n–1–th command from a reception time of an n–th command is below a predetermined time, for example, 50 milliseconds, it may be determined that the time continuity is present between the n–1–th command and the n–th command, and thus the reference point V is increased by "1". In an alternate embodiment, time continuity is present also when the value is equal to the predetermined time. However, if the value is above or equal the predetermined time, it may be interpreted as lacking time continuity. When the time intervals between the commands in the performance mode are relatively short, the storage device 10 may rapidly respond to commands from the host 300.

In operation S630, the reference point V is increased by "1" if logical page addresses required by the commands have continuity, and decreased by "1" if the logical page addresses required by the commands do not have continuity. The continuity of the logical page addresses may be determined to be present by checking whether data of continuous addresses are used. For example, if a value obtained by adding a sector count of an n–1–th command to a logical page address of the n–1–th command is equal to a logical page address of the n–th command, it is determined that continuity of the logical page addresses is present between the n–1–th command and the n–th command, and thus the reference point V is increased. Data that is read or written from continuous logical page addresses may have been obtained by an operation of a specific application or program. For example, sequential reading or writing is performed in the storage device 10 when data is copied or a video is output by an operation of an application or a program. However, if the storage device 10 were switched to a low power mode from the performance mode during a task that includes this sequential reading or writing, a freezing of the task may be observed. Thus, by taking into account continuity of logical page addresses, this freezing can be avoided.

However, unlike the above mentioned example, some applications like a game may configure logical page addresses at random. Thus, in operation S630, the method for determining the continuity of the logical page addresses may vary depending on the operation of an application of the host 300.

In operation S640, the reference point V is increased by "1" if the properties of the commands are data type and have continuity, and the reference point V is decreased by "1" if the properties of the commands are non-data type or the properties of commands do not have continuity. For example, if an n–th command and an n–1–th command are commands of the data type, the reference point V is increased by "1" since the n–th command and the n–1–th command have the continuity as the data type. If the n–th command is a command of the non-data type and the n–1–th command is a command of the data type, the reference point V is decreased by "1" since the n–th command and the n–1–th command do not have the continuity as the data type. In addition, if the n-th command and the n−1-th command are commands of the non-data type, the reference point V is decreased by "1" since the n-th command and the n−1-th command do not have the continuity as the data type.

In an embodiment, a command of the data type means a command used for inputting or outputting data used by a user and necessary to read from or write to an input/output (I/O) device. In an embodiment, a command of the non-data type means a command used for inputting or outputting data not used by the user, for example, information for managing the storage device 10 such as a storage capacity and state information of the storage device 10. A command of the data type may require a relatively fast response speed to input or output information used by the user. A command of the non-data type may not require a relatively fast response speed as compared to the command of the data type since the command of the non-data type is a command not used for inputting or outputting information shown to the user.

A data input/output method of a SATA interface, as a host interface method, may be direct memory access (DMA), first party DMA (FPDMA), programmed input/output (PIO), or a multiple method. DMA/FPDMA may be used for improving an input/output speed by permitting movement of data without execution of a program by a processing core and thus DMA/FPDMA commands may be classified as commands of the data type since a relatively fast response speed may be required. However, since PIO/Multiple commands do not require a relatively fast response speed and may not have an effect on performance when operated in the low power mode, the PIO/Multiple commands may be classified as commands of the non-data type.

In operation S650, if a command received from the host 300 is a reset command, a standby command, or a sleep command, the reference point V is reset to "0". Standby and sleep commands do not require a relatively fast response speed as commands for conserving the power of the storage device 10. In addition, a reset command is a command for initializing the storage device 10, and after an initialization, until a task is performed according to a new command, a need to access an input/output (I/O) device is rare. Thus, it is possible to minimize the time required to enter into the low power state by changing to the independent power management method.

In operation S660, it is determined whether the resultant value of the reference point V obtained by the previous operations is larger than a mode selection reference value. The mode selection reference value is a reference value for determining whether the performance mode or the low power mode is to be selected. If the reference point V exceeds the mode selection reference value, it is determined that the commands received from the host 300 correspond to the performance mode (Operation S670). If the reference point V is below the mode selection reference value, it is determined that the commands received from the host 300 correspond to the low power mode (Operation S680).

Although the patterns of the commands are analyzed above in consideration of three characteristics, e.g., continuity of time of the commands, continuity of logical page addresses, and continuity of properties of the commands, the patterns of the commands may be analyzed in consideration of additional or fewer factors for determining whether the storage device 10 is to operate in the performance mode or the low power mode. For example, one or two of steps S620, S630, and S640 may be omitted. Further, the amount in which the reference point V is increased or decreased is not limited to 1 and is not limited to being a constant value. For example, a different weight can be applied based on the type of continuity that is present or lacking. For example, the reference point V could be increased by 2 if time continuity is present and decreased by 0.5 is address continuity is lacking.

In FIG. 6, when analyzing the patterns of the commands based on the history of the commands received from the host 300, if time, address, and data type continuity are all present, the commands may correspond to the performance mode. Response speed may be important for these commands when an input/output (I/O) device is accessed frequently. In FIG. 1, the storage device 10 manages power by using the dependent power management method in the performance mode, and manages power by using the independent power management method in the low power mode. By performing power management by using the dependent power management method, it may be possible to prevent the storage device 10 from frequently entering into the low power state.

With respect to a command in which the I/O device is not frequently accessed, it may be determined that the command corresponds to the low power mode. Thus it may be possible to reduce power consumption by causing the storage device 10 to maintain the low power state for a relatively long time by using the independent power management method.

FIG. 7 is a flowchart illustrating a process of selecting an operation mode by analyzing patterns of commands, according to an exemplary embodiment of the inventive concept.

In operation S710, it is determined whether a command received from the host 300 is a reset command, a standby command, or a sleep command. If the command received from the host 300 is a reset command, a standby command, or a sleep command, the operation mode of the storage device 10 becomes a low power mode. The standby and sleep commands may be used for conserving the power of the storage device 10. The reset command may be used for reducing power consumption by rapidly changing to a low power state. In alternate embodiments, operation S710 is not concerned with all of a reset, standby, and a sleep command. For example, operation S710 could only determine whether the command is the reset command, only determine whether the command is the standby command, only determine whether the command is the sleep command, only determine whether the command is the reset or standby command, only determine whether the command is the standby or the sleep command, or only determine whether the command is the reset or the sleep command.

In operation S720, if a command received from the host 300 is not a reset command, a standby command, or a sleep command, a history of 'n' commands received from the host 300 is stored.

In operation S730, patterns of the commands are analyzed by determining continuity of the commands based on the history of the commands stored in the operation S720. The patterns of the commands may be analyzed in consideration of one or more from among continuity of time, continuity of logical page addresses, and properties of the commands. Thus, the operation S730 may include the operations S620 through S650 of FIG. 6.

If it is determined that the patterns of the commands analyzed in the operation S730 have continuity, it is determined that the storage device 10 is to operate in the performance mode (Operation S740). However, if it is determined that the patterns of the commands do not have continuity, it is determined that the storage device 10 is to operate in the low power mode (Operation S750).

Figure 8:
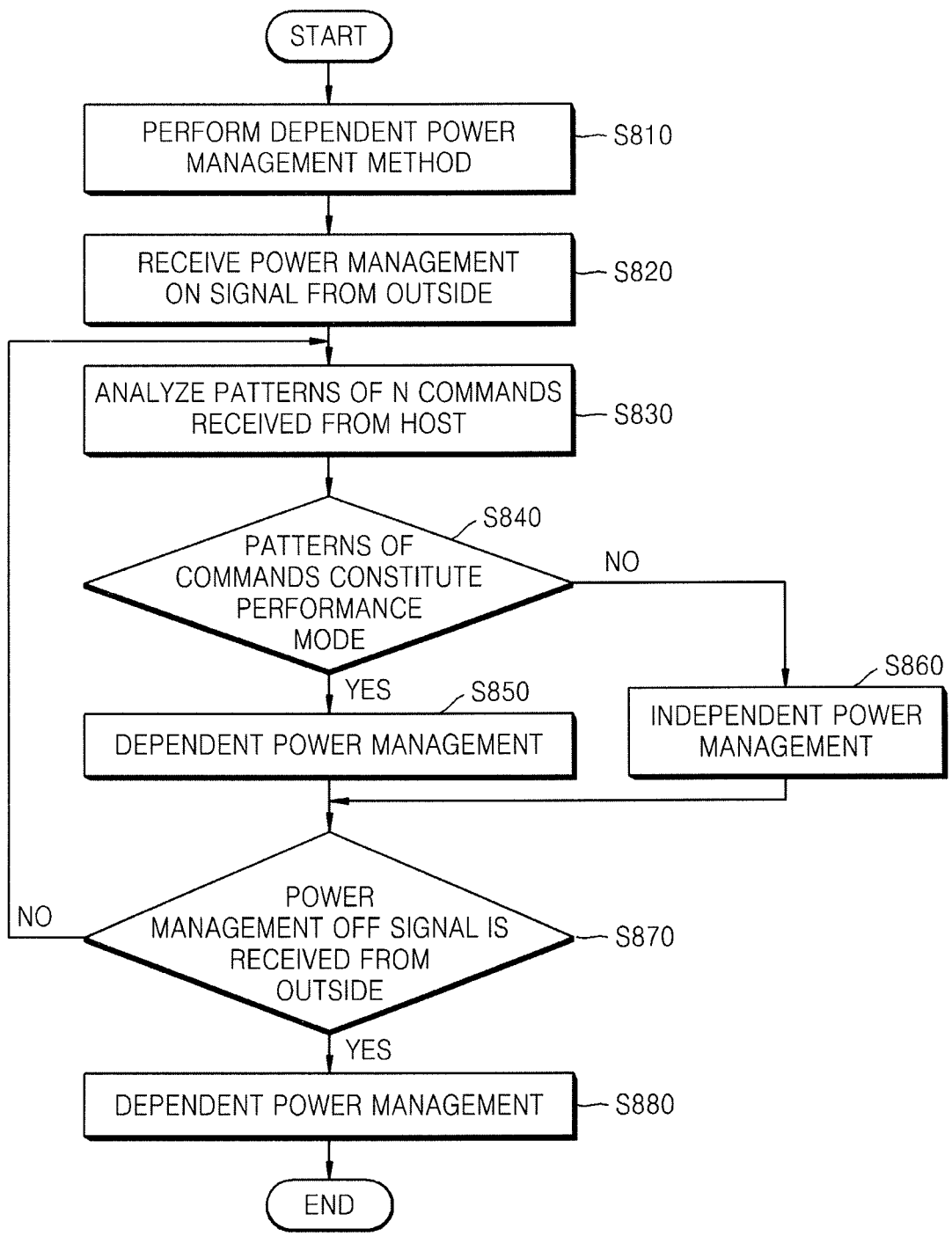
FIG. 8 is a flowchart illustrating a power management method according to an exemplary embodiment of the inventive concept.

FIG. 8 is a flowchart illustrating a power management method according to an exemplary embodiment of the inventive concept.

Referring to FIG. 8, the storage device 10 performs power management by using the dependent power management method (Operation S810). If a power management on signal is received from the outside (Operation S820), an operation mode of the storage device 10 is selected by analyzing patterns of 'n' commands received from the host 300 (Operations S830 and S840), and the dependent power management method or the independent power management method is performed depending on the selected operation mode (Operations S850 and S860).

The power management on signal initiates selecting a power management method by analyzing the patterns of the commands and then commanding a start of power management. The power management on signal may be received from a central processing unit (CPU) or a power management unit of a system including the storage device 10 depending on power conditions of the system. For example, if the storage device 10 is used for a device such as a notebook computer, when the notebook computer operates using an external power source in which a power supply is not limited, performance of the notebook computer may be more important than a reduction of power consumption of the notebook computer. Thus, in this case, power of the storage device 10 may be managed by using the dependent power management method. When a power source of the notebook computer is changed into a limited power source such as a battery in which a power supply is limited, a reduction of power consumption of the storage device 10 as well as performance of the storage device 10 may be important. Thus, in this case, a CPU or a power management unit of the notebook computer may send the power management on signal to the storage device 10.

When the storage device 10 receives the power management on signal from the outside, the storage device 10 may receive the power management on signal depending on, for example, a control condition of a computing system or server system including the storage device 10.

Next, the patterns of the 'n' commands received from the outside are analyzed (Operation S830) and then it is determined whether the patterns of the commands correspond to the performance mode (Operation S840). When the patterns of the commands correspond to the performance mode, the storage device 10 performs power management by using the dependent power management method (Operation 850). When the patterns of the commands do not correspond to the performance mode (e.g., when the patterns of the commands correspond to the low power mode), the power of the storage device 10 is managed by the independent power management method (Operation S860).

Operations S830 and S840 for selecting the operation mode of the storage device 10 by analyzing the patterns of the commands may be one of the methods explained with reference to FIG. 6 and FIG. 7. Thus, detailed explanations of the operations S830 and S840 are not necessary.

Next, it is determined whether a power management off signal is received from the outside (Operation S870). If the power management off signal is received, the power management of the storage device 10 is performed by using the dependent power management method (Operation S880). Otherwise, the power of the storage device 10 is managed by using the dependent power management or the independent power management method as the operation mode of the storage device 10 according to the patterns of the n commands by analyzing the patterns of the n commands (Operations S820 through S860).

For example, in the power management method according to the embodiment of FIG. 8, when performance of the storage device 10, such as a response speed, is more important than a reduction of power consumption of the storage device 10, the dependent power management method is always performed. For example, when both the performance and the reduction of power consumption are important and the power management on signal is received from the outside, the patterns of the commands received from the host 300 are analyzed and then power management is performed according to the operation mode of the storage device 10.

Figure 9:
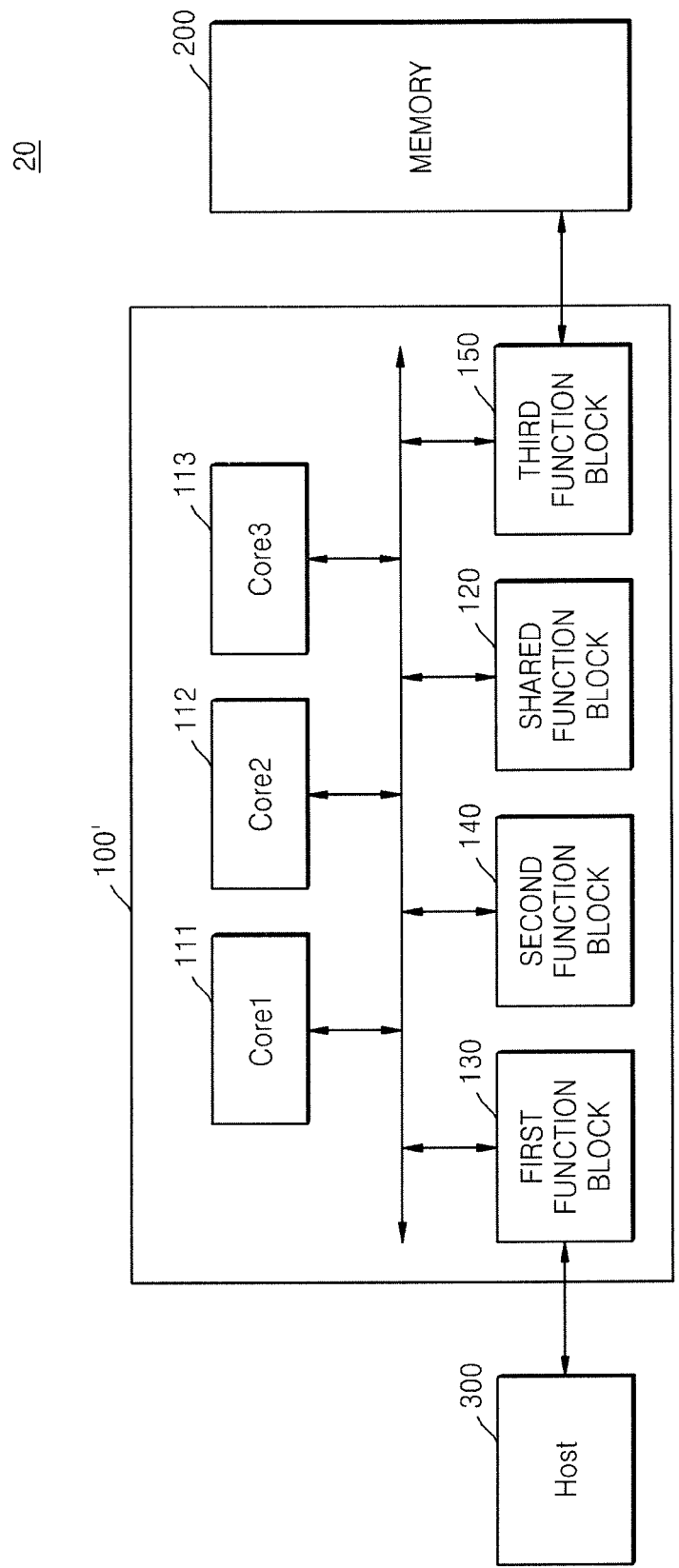
FIG. 9 is a block diagram of a storage device according to an exemplary embodiment of the inventive concept.

FIG. 9 is a block diagram of a storage device 20 according to an exemplary embodiment of the inventive concept.

Referring to FIG. 9, a control unit 100' of the storage device 20 includes a first core 111, a second core 112, a third core 113, and a plurality of function blocks 120, 130, 140, and 150. The first core 111, the second core 112, and the third core 113 execute an operation related to a host 300 and an operation related to a nonvolatile memory 200 by sharing the operations. When performing a task, a first function block 130 is controlled by the first core 111, a second function block 140 is controlled by the second core 112, and a third function block 150 is controlled by the third core 113.

According to an exemplary embodiment of the inventive concept, if patterns of commands received from the host 300 correspond to a performance mode and thus the dependent power management method is performed, a master core, for example, the first core 111, manages power of the function blocks 120, 130, 140, and 150 and the nonvolatile memory 200 by confirming whether the first through third cores 111, 112, and 113 perform tasks.

If the patterns of the commands received from the host 300 correspond to a low power mode and thus the independent power management method is performed, each of the cores 111, 112, and 113 separately manages power of the function blocks controlled by the cores 111, 112, and 113.

Since the dependent power management method and the independent power management method have been stated above with reference to FIGS. 4 and 5, detailed explanations of the power management method and the independent power management method are not repeated.

Figure 10:
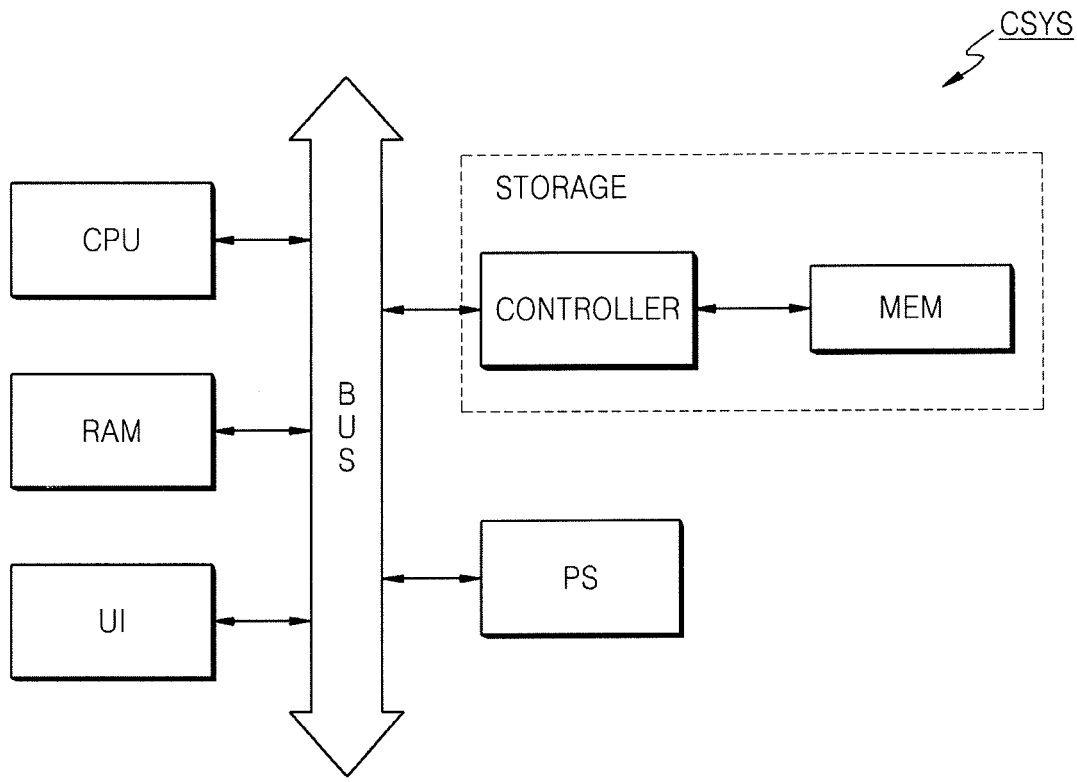
FIG. 10 is a block diagram illustrating a computing system according to an exemplary embodiment of the inventive concept.

FIG. 10 is a block diagram illustrating a computing system CSYS according to an exemplary embodiment of the inventive concept.

Referring to FIG. 10, the computing system CSYS includes a processor CPU, a user interface UI, and a storage device STORAGE that are electrically connected to a bus BUS. The storage device STORAGE includes a plurality of processing cores. Power of the storage device STORAGE may be managed according to the method of FIG. 1. Thus, in the computing system CSYS, it is possible to provide relatively fast performance and reduce power consumption by using the storage device STORAGE including the plurality of processing cores.

When the computing system CSYS is a mobile device, the computing system CSYS may further include a battery (not shown) for supplying an operating voltage to the computing system CSYS and a modem (not shown) such as a baseband chipset. In addition, the computing system CSYS may further include a random access memory (RAM) and a power supply device PS. In addition, although not shown, the computing system CSYS may further include an application chipset, a camera image processor (CIS), a mobile dynamic random access memory (DRAM), etc.

Figure 11:
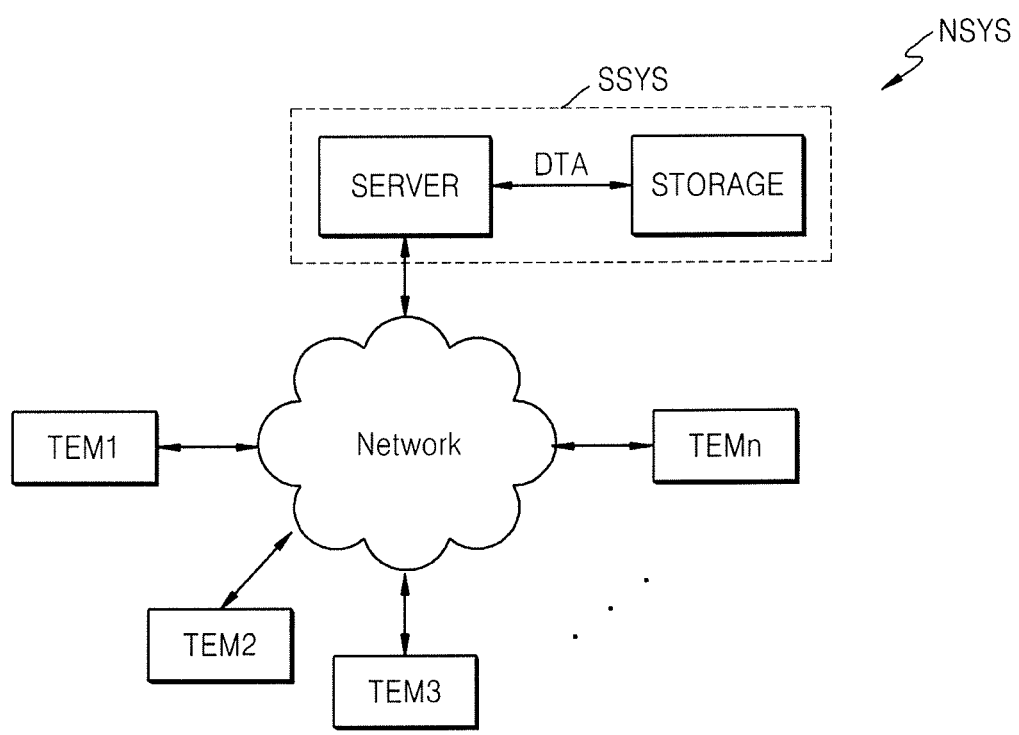
FIG. 11 is a diagram illustrating a server system including a storage device and a network system including the server system according to an exemplary embodiment of the inventive concept.

FIG. 11 is a diagram illustrating a server system SSYS including the storage device STORAGE and a network system NSYS including the server system SSYS.

Referring to FIG. 11, the network system NSYS may include the server system SSYS and a plurality of terminals TEM1 through TEMn that are connected to each other through a network. The server system SSYS may include a server SERVER for processing requests received from the plurality of terminals TEM1 through TEMn and the storage device STORAGE for storing data corresponding to the requests received from the plurality of terminals TEM1 through TEMn. In an embodiment, the storage device STORAGE of FIG. 11 is the solid state driver (SSD) stated with reference to FIG. 2. For example, the storage device STORAGE of FIG. 11 may be an SSD including a plurality of processing cores, and the SSD may be a storage device STORAGE for managing power thereof by using the method of FIG. 1. Thus, in the server system SSYS and the network system NSYS, it may be possible to provide relatively fast performance and reduce power consumption by using the storage device STORAGE including the plurality of processing cores.

While the inventive concept has been particularly shown and described with reference to exemplary embodiments thereof, it will be understood by those of ordinary skill in the art that various changes in form and details may be made therein without departing from the spirit and scope of the inventive concept.

What is claimed is:

1. A method of managing power of a storage device, the method comprising:
    analyzing a plurality of commands received by the storage device to determine a pattern;
    selecting an operation mode of the storage device based on the determined pattern;
    managing power of the entire storage device by using a first processing core if the selected operation mode is a first mode; and
    separately managing power of a first function block and a second function block by using the first processing core to manage power of the first function block and a second processing core to manage power of a second function block, if the selected operation mode is a second mode,
    wherein the storage device comprises the first processing core for controlling the first function block and the second processing core for controlling the second function block.

2. The method of claim 1, wherein the managing the power of the entire storage device by using the first processing core comprises:
    determining whether tasks assigned to the first and second processing cores have ended, by using the first processing core; and
    changing states of the first and second function blocks and a state of a shared function block into a low power state, by using the first processing core, if the tasks assigned to the first and second processing cores have ended.

3. The method of claim 1, wherein the separately managing power of the first and second function blocks comprises:
    determining whether a task assigned to the first processing core and a task assigned to the second processing core have ended, by using the first and second processing cores, respectively; and
    changing a state of a function block controlled by a processing core in which a task has ended, from among the first and second processing cores, into a low power state.

4. The method of claim 3,
    wherein the storage device further comprises a shared function block controlled by the first and second processing cores,
    wherein the shared function block separately manages the power of the first and second function blocks by using the first and second processing cores, respectively, and the method further comprises:
    writing information indicating a task assigned to a memory shared by the first and second processing cores has ended, by using the processing core in which a task has ended;
    confirming whether tasks of the first and second processing cores have ended, by using the first processing core to check the shared memory; and
    changing a state of the shared function block into the low power state.

5. The method of claim 1, wherein the analyzing the plurality of the commands comprises analyzing the pattern of the commands according to one or more from among continuity of time, continuity of logical page addresses, and continuity of properties of the commands.

6. The method of claim 1, wherein the analyzing the plurality of the commands comprises:
    storing a history of 'n' commands received by the storage device; and
    analyzing the pattern of the commands based on the stored history,
    wherein 'n' is an integer greater than 1.

7. The method of claim 6, wherein the analyzing the pattern of the commands based on the stored history comprises:
    setting a reference point for the history of the commands; and
    increasing or decreasing the reference point by determining whether the commands have continuity of time, continuity of logical page addresses, or continuity of properties of the commands, based on the history of the commands.

8. The method of claim 7, wherein the selecting the operation mode of the storage device comprises:
    determining that the operation mode is the first mode if a resultant value of the reference point exceeds a mode selection reference value; and
    determining that the operation mode is the second mode if the resultant value of the reference point is below the mode selection reference value.

9. The method of claim 1, wherein the selecting the operation mode of the storage device comprises determining that the operation mode is the first mode if one of the received commands is a reset command, a sleep command, or a standby command.

10. The method of claim 1, wherein the storage device further comprises a third processing core for controlling a third function block, and the managing the power comprises managing the power of the storage device by using the first processing core if the selected operation mode is the first mode, and separately managing power of the first, second, and third function blocks by using the first, second, and third processing cores, respectively, if the selected operation mode is the second mode.

11. The method of claim 1, wherein an initial operation mode of the storage device is the first mode.

12. The method of claim 1, wherein the storage device comprises a solid state drive (SSD).

13. The method of claim 1, wherein the selected operation mode is the first mode when the pattern indicates that a continuity is associated with the commands and the selected operation mode is the second mode when the pattern indicates that there is no continuity associated with the commands.

14. A method of managing power of a storage device, the method comprising:
    managing power of the entire storage device by using a first processing core;

analyzing 'n' commands received to determine a pattern upon receiving an external power management on signal, where 'n' is an integer larger than one;

selecting an operation mode of the storage device based on the determined pattern; and separately managing power of first and second function blocks by using a first processing core to manage power of the first function block and a second processing core to manage power of the second function block, respectively, if a low power mode is selected.

15. The method of claim 14, further comprising:

selecting the operation mode of the storage device by analyzing a pattern of 'n' other received commands; and managing the power of the entire storage device by using the first processing core if a performance mode is selected.

16. The method of claim 15, further comprising:

managing the power of the entire storage device by using the first processing core upon receiving an external power management off signal.

17. The method of claim 14, wherein the low power mode is selected when the pattern indicates there is no continuity associated with the commands.

18. A storage device comprising:

a first processing core;

a second processing core;

a first function block;

a second function block; and a memory, wherein one of the processing cores is configured to analyze a plurality of commands received by the storage device to determine a pattern, and select one of a first mode and a second mode based on the pattern, wherein one of the processing cores manages power of the first and second functional blocks when the first mode is selected, wherein the first processing core manages power of the first function block and the second processing core manages power of the second function block when the second mode is selected.

19. The storage device of claim 18, wherein each function block is set to a lower power state by the processing core that manages its power after all tasks of the corresponding core have ended.

20. The storage device of claim 19, wherein each processing core is configured to apply a clock signal to the function block whose power it manages while the corresponding core is performing at least one task, and wherein each processing core is configured to prevent application of the clock signal to the function block whose power it manages to set the function block to the lower power state.

21. The storage device of claim 18, further comprising:

a third function block that is shared by the first and second processing cores, and configured to handle tasks relating to an external host and the memory, wherein the first function block is configured to handle tasks related to the host, and wherein the second function block is configured to handle tasks related to the memory.

22. The storage device of claim 21, wherein the third function block comprises a shared memory, and each processing core is configured to store a record in the shared memory indicating it has ended a task.

23. The storage device of claim 18, wherein the selected mode is the first mode when the pattern indicates that a continuity is associated with the commands and the selected operation mode is the second mode when the pattern indicates that there is no continuity associated with the commands.

* * * * *